United States Patent
Trinkenschuh et al.

(10) Patent No.: US 11,167,747 B2
(45) Date of Patent: Nov. 9, 2021

(54) DRIVE UNIT FOR A HYBRID MOTOR VEHICLE A WITH VARIABLE OUTPUT TRANSMISSION RATIO

(71) Applicant: Schaeffler Technologies AG & Co. KG, Herzogenaurach (DE)

(72) Inventors: Andreas Trinkenschuh, Bühl (DE); Steffen Lehmann, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/764,933

(22) PCT Filed: Nov. 15, 2018

(86) PCT No.: PCT/DE2018/100932
§ 371 (c)(1),
(2) Date: May 18, 2020

(87) PCT Pub. No.: WO2019/105504
PCT Pub. Date: Jun. 6, 2019

(65) Prior Publication Data
US 2020/0346636 A1 Nov. 5, 2020

(30) Foreign Application Priority Data

Nov. 29, 2017 (DE) .......................... 102017128289.0
Feb. 14, 2018 (DE) .......................... 102018103245.5

(51) Int. Cl.
*B60W 20/30* (2016.01)
*B60K 6/387* (2007.10)
(Continued)

(52) U.S. Cl.
CPC ............ *B60W 20/30* (2013.01); *B60K 6/387* (2013.01); *B60K 6/547* (2013.01); *B60W 10/06* (2013.01);
(Continued)

(58) Field of Classification Search
CPC .............. B60W 20/30; B60W 10/06; B60W 2510/0241; B60K 6/387; B60K 6/547;
(Continued)

(56) References Cited

U.S. PATENT DOCUMENTS 10,814,709 B2 * 10/2020 Yu ............................ B60K 1/02
2010/0025128 A1 * 2/2010 Abe ........................ B60L 50/61
180/65.25
(Continued)

FOREIGN PATENT DOCUMENTS

DE 10 2015 222 690 A1 5/2017
DE 10 2015 222 691 A1 5/2017
(Continued)

Primary Examiner — David J Hlavka
(74) Attorney, Agent, or Firm — LeKeisha M. Suggs

(57) ABSTRACT

A drive unit for a drivetrain of a hybrid motor vehicle comprises a first electric machine and a second electric machine, which, in respect of its rotor, is arranged coaxially with an axis of rotation of a rotor of the first electric machine. A first transmission stage is arranged between a drive component, which is configured to be selectively coupled for conjoint rotation to an output shaft of an internal combustion engine, and a power shaft of the first electric machine and/or of the second electric machine. A transmission component unit is provided, via which the power shaft of the respective electric machine is configured to be selectively coupled to wheel driveshafts. The drive component of the internal combustion engine is coupled to an intermediate gear unit via a second transmission stage. The intermediate gear unit has an integrated clutch and is further connected to the wheel driveshafts in such a way that, depending on the position of the integrated clutch, the internal combustion engine is coupled to the wheel driveshafts via at least the second transmission stage or is decoupled from the wheel driveshafts.

9 Claims, 3 Drawing Sheets

(51) Int. Cl.
*B60K 6/547* (2007.10)
*B60W 10/06* (2006.01)
*B60K 6/48* (2007.10)

(52) U.S. Cl.
CPC ........... *B60K 2006/4808* (2013.01); *B60W 2510/0241* (2013.01); *B60Y 2200/92* (2013.01); *B60Y 2400/42* (2013.01)

(58) Field of Classification Search
CPC .. B60K 2006/4808; B60K 6/44; B60K 6/442; B60K 6/36; B60K 17/16; B60K 17/22
See application file for complete search history.

(56) References Cited

U.S. PATENT DOCUMENTS

| | | | |
|---|---|---|---|
| 2013/0131941 A1* | 5/2013 | Kitahata | F16F 15/1297 701/58 |
| 2013/0297133 A1* | 11/2013 | Hasegawa | B60K 17/35 701/22 |
| 2014/0296013 A1* | 10/2014 | Hata | B60K 6/365 475/5 |
| 2015/0080162 A1* | 3/2015 | Motoyama | B60K 6/387 475/5 |

FOREIGN PATENT DOCUMENTS

| | | |
|---|---|---|
| DE | 10 2015 222 692 A1 | 5/2017 |
| DE | 10 2015 222 694 A1 | 5/2017 |
| DE | 102017127695 A1 | 5/2019 |
| EP | 2284030 A1 | 2/2011 |
| EP | 2857243 A2 | 4/2015 |
| JP | 7-96759 A | 4/1995 |
| JP | 11-299175 A | 10/1999 |
| JP | 2000-328956 A | 11/2000 |
| JP | 2001138752 A | 5/2001 |
| JP | 2013121788 A | 6/2013 |
| WO | 2010095610 A1 | 8/2010 |
| WO | 2013/129011 A1 | 9/2013 |
| WO | 2017/084887 A1 | 5/2017 |
| WO | 2017/084888 A1 | 5/2017 |
| WO | 2017/084889 A1 | 5/2017 |

* cited by examiner

DRIVE UNIT FOR A HYBRID MOTOR VEHICLE A WITH VARIABLE OUTPUT TRANSMISSION RATIO

CROSS-REFERENCE TO RELATED APPLICATIONS

This application is the U.S. National Phase of PCT Appln. No. PCT/DE2018/100932 filed Nov. 15, 2018, which claims priority to DE 102018103245.5 filed Feb. 14, 2018 and DE 102017128289.0 filed Nov. 29, 2017, the entire disclosures of which are incorporated by reference herein.

TECHNICAL FIELD

The disclosure relates to a drive unit for a drivetrain of a hybrid motor vehicle, e.g. a hybrid motor car, heavy goods vehicle, bus or other commercial vehicle, having an internal combustion engine, e.g. a spark-ignition or diesel engine, a first electric machine, a second electric machine, which, in respect of its rotor, is arranged coaxially with an axis of rotation of a rotor of the first electric machine, a first transmission stage arranged between a drive component, which is or can be coupled for conjoint rotation to an output shaft of the internal combustion engine, and a power shaft of the first electric machine and/or of the second electric machine, and a transmission component unit, via which the power shaft of the respective electric machine is or can be coupled to a wheel drive.

BACKGROUND

The Applicant knows of an as yet unpublished German patent application with the file reference 10 2017 127 695.5, filed on Nov. 23, 2017, which discloses a drivetrain for a hybrid motor vehicle. This drivetrain likewise has two electric machines and an internal combustion engine, which can be brought into operative relationship with one another.

Additional prior art of the type in question is known from DE 10 2015 222 690 A1, DE 10 2015 222 691 A1, DE 10 2015 222 692 A1, DE 10 2015 222 694 A1, WO 2017/084 887 A1, WO 2017/084 888 A1 and WO 2017/084 889 A1.

However, one disadvantage that has been found in the prior art is that the embodiments known there, while implementing a number of different overall transmission ratios between the internal combustion engine and the wheel driveshafts, are either of relatively large and complex design or, with a compact design, do not allow the implementation of a number of overall transmission ratios between the internal combustion engine and the wheel driveshafts owing to the restricted installation space.

SUMMARY

It is therefore the object of the present disclosure to eliminate the disadvantages known from the prior art and, in particular, to make available a drive unit for a hybrid motor vehicle which is both of as compact construction as possible and allows an overall transmission ratio (drive transmission ratio) which is as flexibly adjustable as possible along the torque transmission path between the internal combustion engine and the wheel driveshafts.

According to the disclosure, this is achieved by virtue of the fact that the drive component of the internal combustion engine is coupled to an intermediate gear unit via a second transmission stage, wherein the intermediate gear unit has an integrated (first) clutch and is further connected to the wheel drive in such a way that, depending on the position of this (first) clutch, the internal combustion engine is coupled to the wheel driveshafts via at least the second transmission stage or is decoupled from these wheel driveshafts.

By means of this design according to the disclosure of a drive unit, a transmission ratio for the connection between the internal combustion engine and the wheel drive can be selected in as flexible a manner as possible. Torque transmission from the internal combustion engine takes place either via the first transmission stage toward the respective power shaft and, from there, via the transmission component unit, toward the wheel driveshafts or, via the second transmission stage, directly toward the wheel driveshafts via the intermediate gear unit. Moreover, a particularly compact arrangement and design of the drive unit is implemented by means of the design of the electric machine, together with the power shafts.

Further advantageous embodiments are claimed by the claims and are explained in greater detail below.

Accordingly, it is furthermore advantageous if the intermediate gear unit has a first intermediate shaft, which is connected/coupled for conjoint rotation to the drive component of the internal combustion engine via the second transmission stage, and a second intermediate shaft, which is operatively connected or can be coupled to the first intermediate shaft via the (first) clutch. The construction of the intermediate gear unit is thereby kept particularly simple.

In this context, it is also expedient if the first intermediate shaft and the second intermediate shaft are arranged coaxially with one another. This allows a particularly compact arrangement of the two intermediate shafts relative to one another.

If a first power shaft of the electric machine is operatively connected or can be coupled to a second power shaft of the second electric machine via a further (second) clutch, the construction of the transmission component unit furthermore connected to the power shafts is kept as simple as possible. This is because the power shafts then preferably have a common input on the same side as the internal combustion engine and a common output on the same side as the transmission component unit.

It is furthermore advantageous if the first power shaft is connected/coupled for conjoint rotation to the drive component of the internal combustion engine directly via the first transmission stage. It is particularly preferable if the drive component of the internal combustion engine is a drive flange. The construction of the drive unit is thereby also kept simple.

In this context, it is also expedient if the second power shaft is furthermore rotationally coupled to the wheel driveshafts via a third transmission stage (of the transmission component unit).

If the second power shaft is rotationally (indirectly) connected/coupled to a further third intermediate shaft by means of the third transmission stage, the functionality of the transmission component unit is extended.

In this context, it is accordingly particularly advantageous if a parking lock is provided on the third intermediate shaft, said lock blocking rotation of the third intermediate shaft in its activated state.

It is furthermore expedient if the third intermediate shaft is rotationally coupled to a differential of a wheel drive (preferably via a further fourth transmission stage). The wheel drive then typically has not only the differential but also the wheel driveshafts, which are connected to a driven wheel of the motor vehicle for conjoint rotation therewith.

In this context, it is again expedient if the second intermediate shaft is rotationally connected/coupled to the differential (preferably via a further (fifth) transmission stage). The construction is thereby likewise kept particularly simple.

It is furthermore advantageous if the first clutch and/or the second clutch are/is in each case designed as friction clutches (a friction clutch), particularly preferably as multi-disk clutches (a multi-disk clutch), thus allowing overlapping shifting. In further embodiments, the first clutch and/or the second clutch are/is also embodied as dog clutches (a dog clutch) or as magnetic clutches (a magnetic clutch) or as magnetorheological clutches (a magnetorheological clutch).

It is furthermore advantageous if the output shaft is coupled to the drive component via a damping unit, which is preferably designed as a torsional vibration damper, such as a single- or dual-mass flywheel, and/or a further (third) clutch, preferably in the form of a slipping clutch. It is thereby also possible to decouple the drive component from the output shaft. It is thus also possible during operation for at least the first power shaft to be connected to the wheel driveshafts (via a differential) by means of the two overall transmission ratios.

In other words, a drive unit for hybrid vehicles having two variable output transmission ratios is thus obtained according to the disclosure. According to the disclosure, the drive unit for the hybrid vehicle has an internal combustion engine, two electric machines, which are arranged coaxially relative to one another, a first transmission stage, which is arranged in an appropriate manner between the internal combustion engine and the two electric machines or between the input and output shafts (power shafts) thereof, and a second transmission stage, which is arranged between the internal combustion engine and a countershaft (first intermediate shaft), which has an integrated separating clutch (first clutch).

BRIEF DESCRIPTION OF THE DRAWINGS

The disclosure will now be explained in greater detail below by means of figures, of which.

The figures are of a purely schematic nature and serve only to aid understanding of the disclosure. Identical elements are provided with the same reference signs.

DETAILED DESCRIPTION

Figure 1:
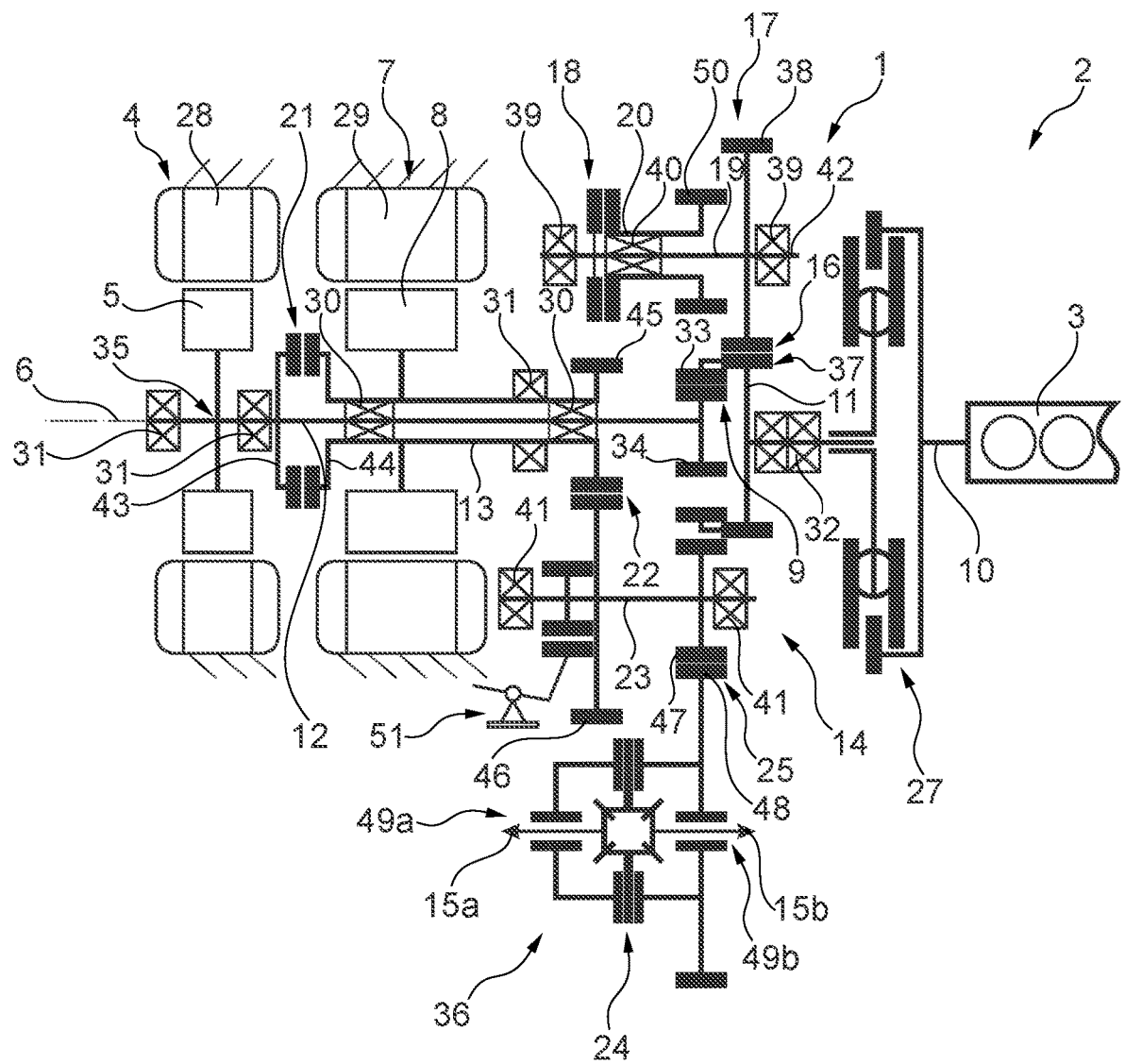
FIG. 1 shows a simplified sectional view of a drive unit according to the disclosure in accordance with a preferred illustrative embodiment.

A drive unit 1 according to the disclosure is illustrated in respect of its basic construction in FIG. 1. The drive unit 1 is implemented as a hybrid drive unit 1 and is part of a drivetrain 2 of a (hybrid) motor vehicle.

The drive unit 1 has an internal combustion engine 3 in the form of a spark-ignition or diesel engine as well as two electric machines 4 and 7. The internal combustion engine 3 has an output shaft 10, which is designed as a crankshaft and, as described in greater detail below, is furthermore coupled to a drive component 11. The electric machines 4, 7 are each embodied as three-phase motors and each have a stator 28, 29, arranged in a manner fixed with respect to the housing, and a rotor 5, 8, which is rotatable relative to the stator 28, 29. As an option, the first electric machine 4 and the second electric machine 7 are cooled by means of a fluid, such as oil or water.

A first electric machine 4 has a stator 28, which is accommodated in a fixed manner in a transmission housing for example, and a rotor 5, which is mounted so as to be rotatable relative to said stator 28. The rotor 5 is connected for conjoint rotation to a (first) power shaft 12, which can be assigned to the first electric machine 4. The first power shaft 12 is mounted so as to be rotatable in relation to an axis of rotation 6. The first power shaft 12 is arranged coaxially with a second power shaft 13, which second power shaft 13 can in turn be regarded as part of a second electric machine 7. The first power shaft 12 is embodied as a solid shaft. The second power shaft 13 is designed as a hollow shaft arranged radially outside the first power shaft 12. A rotor 8 of the second electric machine 7 is connected for conjoint rotation to the second power shaft 13. The second electric machine 7 also has a stator 29, which is likewise accommodated in the transmission housing for example and relative to which the rotor 8 is rotatably mounted.

The two first and second power shafts 12 and 13 are mounted so as to be rotatable relative to one another by means of two (first) bearings 30, here in the form of rolling bearings. The two first and second power shafts 12 and 13 are also mounted so as to be rotatable relative to a region which is fixed with respect to the housing by means of a plurality of (second) bearings 31, here in the form of rolling bearings. Two (second) bearings 31 are arranged directly on the first power shaft 12, a further (second) bearing 31 is arranged directly on the second power shaft 13.

As is furthermore apparent, the output shaft 10 is connected permanently for conjoint rotation, by means of a damping unit 27 in the form of a dual-mass flywheel, to the drive component 11 assigned to the internal combustion engine 3. As an alternative or in addition to this damping unit 27, a (third) clutch is inserted at this point in other embodiments. In a closed position of the third clutch, the output shaft 10 is then consequently connected for conjoint rotation to the drive component 11 and, in an open position of the third clutch, the drive component 11 and the output shaft 10 are correspondingly freely rotatable relative to one another or decoupled rotationally from one another. The drive component 11 is designed as a drive flange. The drive component 11, in turn, is mounted by means of a (third) bearing 32, here in the form of rolling bearings, on the housing side. The third bearing 32 is designed as a double-row bearing 32.

The drive component 11 has a first geared region 33, which is in mesh with gearing 34 formed on the first power shaft 12. As can be seen in FIG. 1, this gearing 34 is arranged in that (end) region of the first power shaft 12 which is arranged at a distance along the axis of rotation 6 from a rotor connection region 35 of the first power shaft 12. In the rotor connection region 35, the first power shaft 12 is connected to the rotor 5 for conjoint rotation therewith. The first power shaft 12 extends in the axial direction/along the axis of rotation 6 through the second power shaft 13, between the rotor connection region 35 and the region accommodating the gearing 34. The gearing 34 is therefore arranged on the region of the first power shaft 12 which projects from the second power shaft 13. Consequently, the drive component 11 is connected for conjoint rotation to the first power shaft 12 via a first transmission stage 9, which is formed by the connection of the first geared region 33 to the gearing 34.

Moreover, the drive component 11 is provided with a second geared region 37. This second geared region 37 is in mesh with gearing 38 of a (first) intermediate shaft 19. The intermediate gear unit 17 also has an integrated (first) clutch 18, which serves as a couplable/decouplable connecting member between the first intermediate shaft 19 and a second intermediate shaft 20 of the intermediate gear unit 17. The first clutch 18 is embodied as a friction clutch. In a closed position of the first clutch 18, the first intermediate shaft 19 is connected to the second intermediate shaft 20 for conjoint rotation therewith. In an open position of the first clutch 18, the two intermediate shafts 19 and 20 are freely rotatable relative to one another/decoupled rotationally from one another. The first intermediate shaft 19 is arranged coaxially with the second intermediate shaft 20 in respect of its (second) axis of rotation 42. The second intermediate shaft 20 is embodied as a hollow shaft and is arranged radially outside the first intermediate shaft 19.

By means of two further (fourth) bearings 39, the first intermediate shaft 19 is arranged so as to be rotatable relative to a region fixed with respect to the housing. By means of a further (fifth) bearing 40, the second intermediate shaft 20 is mounted so as to be rotatable relative to the first intermediate shaft 19. By virtue of this design of the intermediate gear unit 17, the drive component 11 is permanently connected for conjoint rotation to the first intermediate shaft 19 (input of the intermediate gear unit 17) via a second transmission stage 16 formed by the connection between the second geared region 37 and the gearing 38.

A (second) clutch 21 furthermore acts between the first power shaft 12 and the second power shaft 13. The second clutch 21 is likewise embodied as a friction clutch. A first clutch component 43 of the second clutch 21 is connected for conjoint rotation to the first power shaft 12. The first clutch component 43 is arranged on the first power shaft 12 on the same side relative to the second power shaft 13 as the rotor connection region 35. A second clutch component 44 of the second clutch 21 is connected for conjoint rotation to the second power shaft 13. In a closed position of the second clutch 21, the two clutch components 43 and 44 of the second clutch 21 are typically connected/coupled to one another for conjoint rotation and, in an open position of the second clutch 21 they are arranged so as to be freely rotatable relative to one another/rotationally decoupled.

The second clutch component 44 of the second clutch 21 is arranged on a first end region of the second power shaft 13, which first end region faces the rotor 5 of the first electric machine 4. Gearing 45 is formed on a second end region of the second power shaft 13, said end region being situated axially opposite said first end region. By means of this gearing 45, the second power shaft 13 is in operative connection with a transmission component unit 14. The transmission component unit 14 is likewise implemented as an intermediate gear unit and forms a component unit of the transmission unit, which also includes the intermediate gear unit 17. Conversely, the intermediate gear unit 17 should therefore also be regarded as a transmission component unit.

The transmission component unit 14 has a (third) intermediate shaft 23. The third intermediate shaft 23 has a first geared region 46, which is in mesh with the gearing 45. The second power shaft 13 is thereby connected via a (third) transmission stage 22 formed by the gearing 45 and the first geared region 46 to the transmission component unit 14/the third intermediate shaft 23.

In addition to the first geared region 46, the third intermediate shaft 23 has a second geared region 47, which is arranged at an axial distance from said first geared region 46. This second geared region 47 is operatively connected to a differential 24 of a wheel drive 36. The second geared region 47 is in mesh with gearing 48 of the differential 24. The gearing 48 is formed by an externally toothed drive wheel of the differential 24, for example. The connection between the second geared region 47 and the gearing 48 is formed by a (fourth) transmission stage 25. Thus, the second power shaft 13 is connected rotationally to the differential 24 during operation by the combination of the third transmission stage 22 and the fourth transmission stage 25. By means of two (sixth) bearings 41, the third intermediate shaft 23 is arranged so as to be rotatable relative to a region fixed with respect to the housing.

In addition to the differential 24, the wheel drive 36 typically has two wheel driveshafts 15a, 15b, which are each connected for rotation to a driven wheel of the motor vehicle. The differential 24 is connected by in each case one output 49a, 49b to one of the wheel driveshafts 15a, 15b during operation.

Moreover, the second intermediate shaft 20 has gearing 50. Even if this is not illustrated in FIG. 1 for the sake of clarity, this gearing 50 is in mesh with the gearing 48 of the differential 24. The connection between the gearing 50 and the gearing 48 is formed by a (fifth) transmission stage 26.

According to the disclosure, the drive component 11 is thereby coupled via the second transmission stage 16 to the intermediate gear unit 17, wherein the intermediate gear unit 17 has the integrated first clutch 18 and can thus be further coupled to the wheel driveshafts 15a, 15b via the differential 24. Depending on the position of the first clutch 18, the internal combustion engine 3 is coupled to the wheel drive 36/the differential 24 via the second transmission stage 16 and the fifth transmission stage 26 in a first operating mode (closed position of the first clutch 18), or is rotationally decoupled from the wheel drive 36/the differential 24 in a second operating mode (open position of the first clutch 18).

Figure 2:
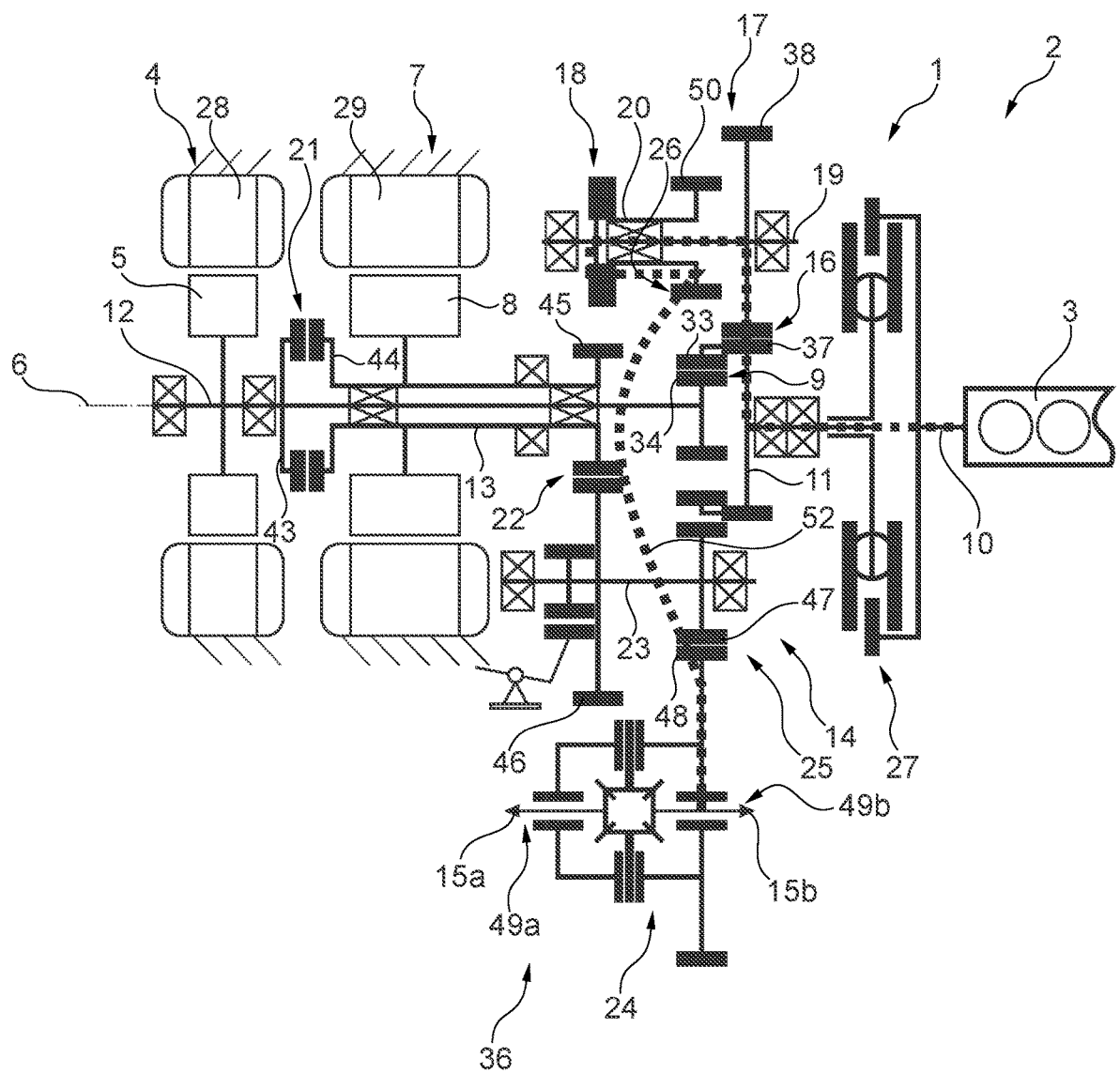
FIG. 2 shows a simplified sectional view of the drive unit, similar to FIG. 1, wherein a torque transmission path between an internal combustion engine and a differential implementing a first overall transmission ratio is additionally depicted.
Figure 3:
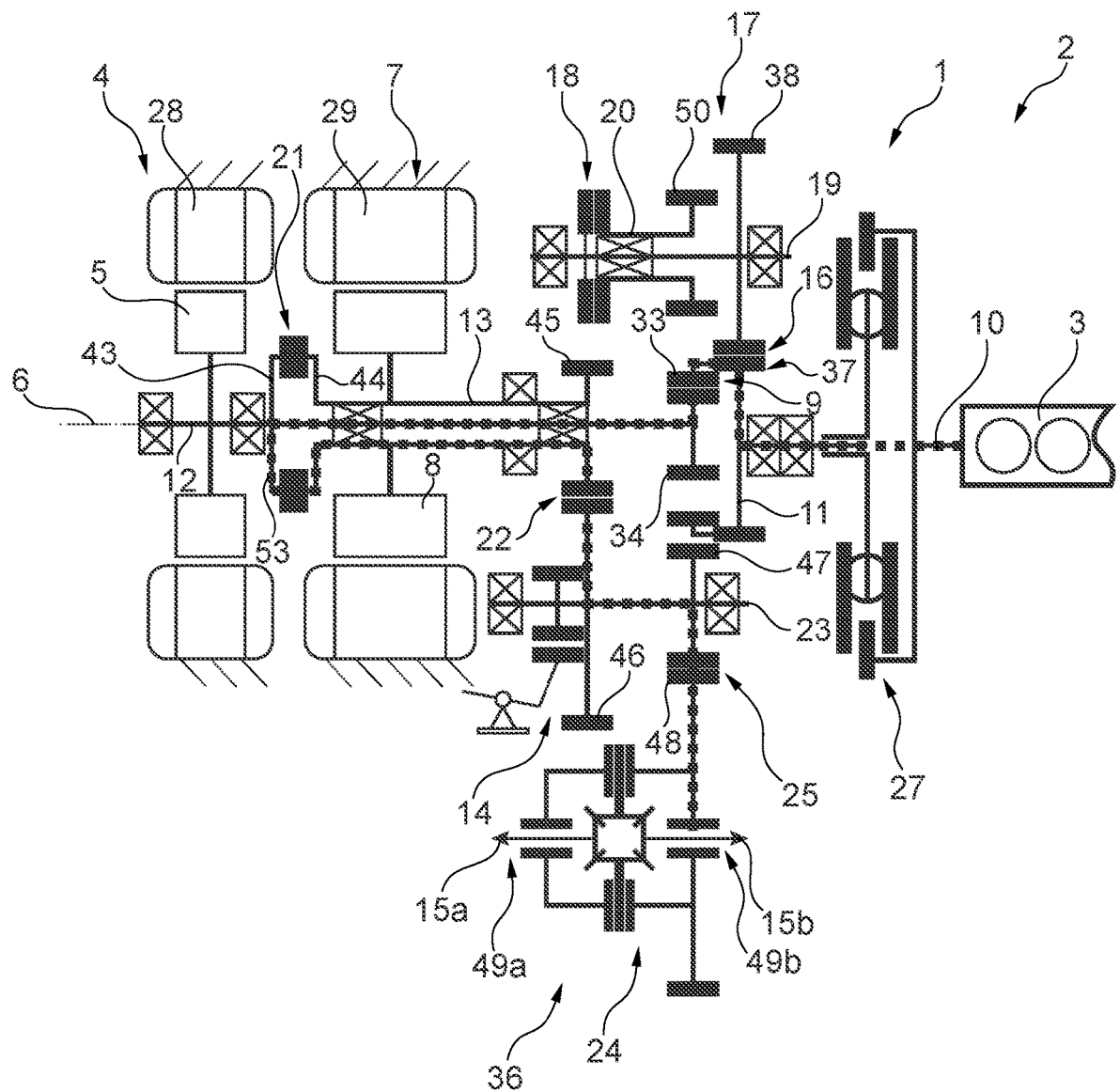
FIG. 3 shows a simplified sectional view of the drive unit, similar to FIG. 1, wherein now a further torque transmission path between the internal combustion engine and a differential via power shafts of two electric machines and via a transmission component unit, implementing a second overall transmission ratio is depicted.

The two operating modes are implemented in conjunction with FIGS. 2 and 3, wherein the torque transmission path 52, 53 implemented between the internal combustion engine 3 and the differential 24 is in each case indicated.

In FIG. 2, the second clutch 21 is open and the first clutch 18 is closed. Consequently, torque transmission (first torque transmission path 52) takes place from the drive component 11, via the second transmission stage 16, to the first intermediate shaft 19, via the first clutch 18, via the second intermediate shaft 20 and the fifth transmission stage 25 toward the differential 24 and, from there, to the individual wheel driveshafts 15a, 15b. The output shaft 10/the drive component 11 is thereby coupled/connected via a first overall transmission ratio (formed by transmission stages 16 and 25 and the transmission ratio of the differential 24) to the respective wheel driveshaft 15a, 15b.

In FIG. 3, the first clutch 18 is open and the second clutch 21 is closed. Consequently, torque transmission (second torque transmission path 53) takes place from the drive component 11, via the first transmission stage 9, via the first power shaft 12, via the second clutch 21, via the second power shaft 13, via the third transmission stage 22, the fourth transmission stage 25 and via the differential 24 toward the wheel driveshafts 15a, 15b. The output shaft 10/the drive component 11 is thereby coupled/connected via a second overall transmission ratio (formed by transmission stages 9, 22 and 25 and the transmission ratio of the differential 24) to the respective wheel driveshaft 15a, 15b.

Returning to FIG. 1, it is furthermore apparent that the third intermediate shaft 23 is also operatively connected to a parking lock device 51 (also referred to simply as a parking lock), which blocks rotation of the third intermediate shaft 23 in its activated state and allows/enables rotation of the third intermediate shaft 23 in a deactivated state. The parking lock device 51 is electrically actuated/switchable between its states.

It should also be mentioned in principle that the first and the second clutch 18, 21 are each designed as multi-disk clutches. In further embodiments, the first and the second clutch 18, 21 are each designed independently of one another as a dog clutch or as a magnetic clutch or as a magnetorheological clutch.

In other words, the drive unit 1 according to the disclosure for hybrid vehicles has an internal combustion engine 3, two electric machines EM1 (first electric machine 4) and EM2 (second electric machine 7) arranged coaxially with one another, a transmission stage (first transmission stage 9) between the internal combustion engine 3 and the two electric machines 4, 7 or the input and output shafts thereof (first power shaft 12 and second power shaft 13), and a transmission stage (second transmission stage 16) between the internal combustion engine 3 and the first intermediate shaft 19 with integrated separating clutch (first clutch 18). Two separating elements K0 and K1 (first clutch 18 and second clutch 21) are therefore provided. The separating clutches 18, 21 are either each embodied as a multi-disk clutch or as a dog clutch or as a magnetic clutch or as a magnetorheological clutch. An electrically actuated parking lock 51 is also present. As an option, the first electric machine 4 and/or the second electric machine 7 are/is cooled by means of a fluid, such as oil or water. A power electronics unit is also integrated into the drive unit 1.

An additional intermediate shaft 9 with an integrated separating clutch 18 thus allows a further transmission ratio possibility between the internal combustion engine 3 and the output 36 or vehicle wheels. The first intermediate shaft 9 is connected to the internal combustion engine 3 by means of transmission stage 16 and to the differential 48 by means of a further transmission stage (fifth transmission stage 26). Depending on the driving strategy for the hybrid vehicle, two different, mutually independent transmission stages (overall transmission ratios) can be set by means of this drive unit 1. In the case of the first transmission stage (second overall transmission ratio), the torque flow of the internal combustion engine 3 to the wheel takes place via the (third) intermediate shaft 23. In this case, separating clutch K0 18 on the first intermediate shaft 19 is open. Separating clutch K1 21 is coupled/closed and transmits the input torque of the internal combustion engine 3 onward to the differential 24 or vehicle wheels. At high vehicle speeds with the internal combustion engine 3 as the drive, separating clutch K1 21 is open and the integrated separating clutch K0 18 on the first intermediate shaft 19 is closed. The torque flow of the internal combustion engine 3 takes place through the first intermediate shaft 19 and the differential 24 to the vehicle wheels. In this gear ratio (first overall transmission ratio), the driving machine EM2 7 can be active and/or inactive (FIG. 3). A short transmission stage between the internal combustion engine 3 and the vehicle drive 36 is particularly advantageous for fuel consumption and $CO_2$ emissions. For overlapping shifting between the two transmission stages (first and second overall transmission ratio), it is particularly advantageous if the two clutches 18, 21 are embodied as frictional clutches (friction clutches).

In FIG. 1, reference sign (9) denotes a first transmission stage between the internal combustion engine 3 or drive flange 11 and the two electric machines EM1 4 and EM2 7 or input and output shafts 12 and 13 of the two electric machines EM1 4 and EM2 7, reference sign (21) denotes a separating clutch K1, reference sign (22) denotes a (third) transmission stage between the input and output shafts 12 and 13 of the two electric machines EM1 4 and EM2 7 and a (third) intermediate shaft 23, reference sign (23) denotes the third intermediate shaft, reference sign (25) denotes a (fourth) transmission stage between the third intermediate shaft 23 and a differential 24, reference sign (24) denotes the differential, reference sign (51) denotes a parking lock, reference sign (11) denotes a drive flange, reference sign (12) denotes the input or output shaft of the first electric machine EM1 4, reference sign (13) denotes the input or output shaft of the second electric machine EM2 7, reference sign (27) denotes a damper (damping unit), which optionally has an integrated slipping clutch, reference sign (16) denotes a (second) transmission stage between a first intermediate shaft 19 and the drive flange 11, reference sign (26) denotes a (fifth) transmission stage between the second intermediate shaft 19 and the differential 24, reference sign (19) denotes the first intermediate shaft, and reference sign (18) denotes a separating clutch K0 (first clutch).

Thus, the drive unit 1 for hybrid vehicles allows two different output transmission ratios (overall transmission ratios) of the internal combustion engine 3 to the wheels. Integrating an additional intermediate shaft 19 with an integrated separating clutch 18 into the drive unit 1 makes possible a second transmission stage (first overall transmission ratio) of the internal combustion engine 3 to the wheel. Two different selectable transmission ratios of the internal combustion engine to the wheel are advantageous for the consumption of $CO_2$, depending on the driving mode.

LIST OF REFERENCE NUMBERS 1 drive unit
2 drivetrain
3 internal combustion engine
4 first electric machine
5 rotor of the first electric machine
6 axis of rotation
7 second electric machine
8 rotor of the second electric machine
9 first transmission stage
10 output shaft
11 drive component
12 first power shaft
13 second power shaft
14 transmission component unit
15a first wheel driveshaft
15b second wheel driveshaft
16 second transmission stage
17 intermediate gear unit
18 first clutch
19 first intermediate shaft
20 second intermediate shaft
21 second clutch
22 third transmission stage
23 third intermediate shaft
24 differential
25 fourth transmission stage
26 fifth transmission stage 27 damping unit
28 stator of the first electric machine
29 stator of the second electric machine
30 first bearing
31 second bearing
32 third bearing
33 first geared region of the drive component
34 gearing of the first power shaft
35 rotor connection region
36 wheel drive
37 second geared region of the drive component
38 gearing of the first intermediate shaft
39 fourth bearing
40 fifth bearing
41 sixth bearing
42 second axis of rotation
43 first clutch component
44 second clutch component
45 gearing of the second power shaft
46 first geared region of the third intermediate shaft
47 second geared region of the third intermediate shaft
48 gearing of the differential
49a first output
49b second output
50 gearing of the second intermediate shaft
51 parking lock device
52 first torque transmission path
53 second torque transmission path

The invention claimed is:

1. A drive unit for a drivetrain of a hybrid motor vehicle, comprising:
a first electric machine,
a second electric machine, which, in respect of its rotor, is arranged coaxially with an axis of rotation of a rotor of the first electric machine,
a first transmission stage arranged between a drive component, which is configured to be selectively coupled for conjoint rotation to an output shaft of an internal combustion engine, and a power shaft of the first electric machine and/or of the second electric machine, and
a transmission component unit, via which the power shaft of the respective electric machine is configured to be selectively coupled to wheel driveshafts, wherein the drive component of the internal combustion engine is coupled to an intermediate gear unit via a second transmission stage, wherein the intermediate gear unit has an integrated clutch and is further connected to the wheel driveshafts in such a way that, depending on the position of the integrated clutch, the internal combustion engine is coupled to the wheel driveshafts via at least the second transmission stage or is decoupled from the wheel driveshafts, wherein a first power shaft of the first electric machine is operatively connected to a second power shaft of the second electric machine via a further clutch.

2. The drive unit as claimed in claim 1, wherein the intermediate gear unit has a first intermediate shaft, which is connected for conjoint rotation to the drive component of the internal combustion engine via the second transmission stage, and a second intermediate shaft, which is operatively connected to the first intermediate shaft via the integrated clutch.

3. The drive unit as claimed in claim 2, wherein the first intermediate shaft and the second intermediate shaft are arranged coaxially with one another.

4. The drive unit as claimed in claim 1, wherein the first power shaft is connected directly for conjoint rotation to the drive component of the internal combustion engine via the first transmission stage.

5. The drive unit as claimed in claim 1, wherein the second power shaft is furthermore connected rotationally to the wheel driveshafts via a third transmission stage.

6. The drive unit as claimed in claim 5, wherein the second power shaft is rotationally connected to a further third intermediate shaft by the third transmission stage.

7. The drive unit as claimed in claim 6, wherein the third intermediate shaft is rotationally coupled to a differential.

8. The drive unit as claimed in claim 2, wherein the second intermediate shaft is rotationally connected to a differential.

9. The drive unit as claimed in claim 1, wherein the output shaft is coupled to the drive component via a damping unit and/or a slipping clutch.

* * * * *